United States Patent
Lambert et al.

(10) Patent No.: US 6,621,043 B1
(45) Date of Patent: Sep. 16, 2003

(54) LASER TRIM PROCESS CONTROL

(75) Inventors: Don Lambert, Milpitas, CA (US);
Valerie Vivares, Palo Alto, CA (US);
Ajit M. Dubey, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/033,061

(22) Filed: Nov. 9, 2001

Related U.S. Application Data

(60) Provisional application No. 60/301,945, filed on Jun. 29, 2001.

(51) Int. Cl.[7] .................. B23K 26/00; B23K 26/14; B23K 26/16; B23K 26/18
(52) U.S. Cl. .................. 219/121.69; 219/121.68; 219/121.67
(58) Field of Search .................. 219/121.69, 121.68, 219/121.67, 121.85

(56) References Cited

U.S. PATENT DOCUMENTS

| | | | | |
|---|---|---|---|---|
| 4,918,284 A | * | 4/1990 | Weisz | 219/121.78 |
| 5,209,122 A | * | 5/1993 | Matly et al. | 73/727 |
| 5,896,030 A | * | 4/1999 | Hasken | 324/235 |

* cited by examiner

*Primary Examiner*—M. Alexandra Elve

(57) ABSTRACT

A method of calibrating a laser utilized in a laser element cutting system utilizing a mechanical gauge having pairs of metal pads formed in rows and columns on a substrate material. The height of the metal pads varies in each row with each column having the same height. The depth of the substrate material under the metal pads varies. The mechanical gauge is subjected to a laser cut process and the mechanical gauge is illuminated by a light source. The light shining through positions of metal pads indicates that the metal pad and the underlying substrate material have been cut. The depth of cut is determined from the thickness of the metal layer and the thickness of the substrate material that have been cut.

5 Claims, 3 Drawing Sheets

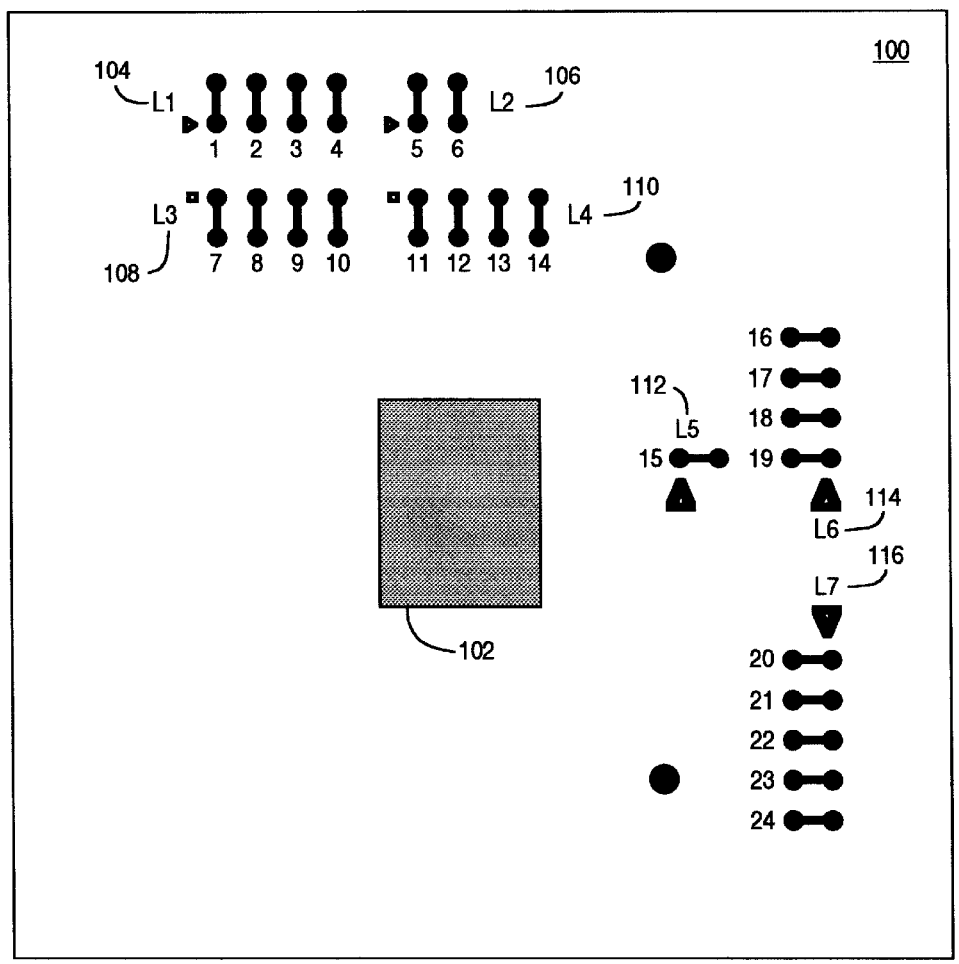
FIGURE 1A
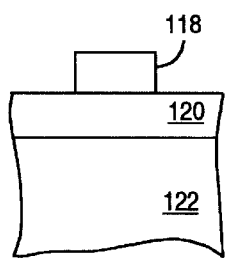
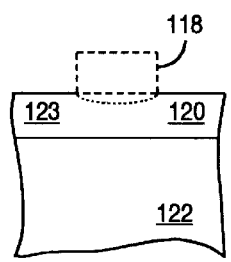
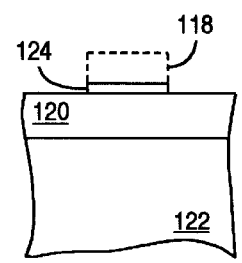
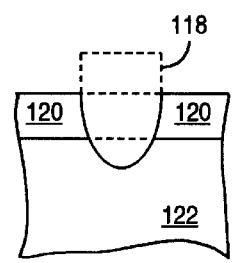
FIGURE 1B FIGURE 1C FIGURE 1D FIGURE 1E

LASER TRIM PROCESS CONTROL

This application claim benefit to provisional application Ser. No. 60/301,945 filed Jun. 29, 2001.

BACKGROUND OF THE INVENTION

1. Field of the Invention

This invention relates generally to PGA (Pin Grid Array) product configuration using a laser trim process. More specifically, this invention relates to the calibration of the lasers used in the laser trim process. Even more specifically, this invention relates to a mechanical gauge and a method to use the mechanical gauge to determine the depth of the laser trim in both the metal and ceramic component of a substrate.

2. Discussion of the Related Art

A laser element is a metallized feature on the top surface of a PGA (Pin Grid Array). The laser element is formed as part of the substrate, using the same molybdenum metallization as other features on the substrate. It has nickel and gold plating. By design, it is part of the electrical circuit on the package and is necessary for proper operation of the product. When the laser element is intact, it connects two parts of a circuit. When cut (trimmed), the two parts of the circuit are not connected. This allows individual processors to be configured differently eliminating the need for the motherboard to be configured.

For example, the processor core operates at a clock rate that is a multiple of the system bus clock rate. BP is the number that represents the multiple of the clock rate. VID (Voltage ID) is a multi-bit setting that is used by a voltage regulator circuit on the motherboard to deliver correct voltage to the processor. The processor core operates at a clock rate that is a multiple of the system bus clock rate. Frequency ID (FID) is a number that represents that multiple of the clock rate, and is used by the "Northbridge" component on the motherboard to send data to the processor at the correct rate. The processor functionality includes the ability to check for errors in system memory, when system memory with error correction is present. Access to this processor functionality can be disabled using this configuration option ECCEN_L (Error Correction Circuit Enable). L2SEL (L2 Select) is a multi-bit setting used by the processor to determine what size of L2 (level 2) cache memory is available. Even if a large L2 cache memory size is physically available on the silicon, access can be limited to a smaller size of cache memory using this configuration option. An RPAK (Resistor Pak) is a discrete component that contains an array of resistors. The resistors are required in certain of the processor configured (laser element) circuits, in order to allow proper electrical testing prior to configuration, and prior to shipping. Other parameters can be configured using laser elements.

Laser cut element and dimensional specification must be characterized and qualified on all substrates before the products are released to production. Each laser cut process has a set of requirements such as the following:

Frequency

Speed

Width of cut

Minimum Depth of cut

Maximum Depth of cut

Average Power

Shape of Cut

Because of the small dimensions, it is mandatory that the laser trim system complies with the set of requirements.

Some of the above requirements set forth above are easily determined and controllable, such as frequency, speed, width of cut, average power, and shape of cut. However, arguably the most important dimension is the depth of cut. There is no current method to accurately determine the depth of cut currently being provided by a laser trim system. The two methods currently used to measure the depth of cut is a destructive cross sectioning and a gross functional microscopic measurement with low accuracy.

Therefore, what is needed is a simple method and system to accurately determine the depth of cut that the laser trim system will provide.

SUMMARY OF THE INVENTION

According to the present invention, the foregoing and other objects and advantages are obtained by a method of using a mechanical gauge to calibrate the laser utilized in a laser element cutting system.

In accordance with a first aspect of the invention, a mechanical gauge having metal pads disposed at the intersections of rows and columns on a surface of a substrate material is formed. The metal pads in each row vary in height and the metal pads in each column have the same height. The thickness of the substrate material underlying each pad varies form a single thickness to a thickness of two or more layers of substrate.

In accordance with a second aspect of the invention, the metal pads are formed in control pairs in columns from an odd numbered row and the next even numbered row.

In accordance with another aspect of the invention, the metal pad of each pair in the odd numbered row is formed on a single layer of substrate material and the metal pad of each pair in the even numbered row is formed from two or more layers of substrate material.

In accordance with another aspect of the invention, the metal pads on the mechanical gauge are subjected to a laser cut process and light is directed towards the mechanical gauge. The transmittal of light at the metal pad positions indicates that the metal pads and underlying layer or layers of substrate material have been cut.

In accordance with another aspect of the invention, the number of layers of substrate material in addition to the metal pad indicates the depth of the laser cut.

The described invention thus provides a method of utilizing a mechanical gauge to accurately determine the depth of a laser utilized in a laser element cutting process.

The present invention is better understood upon consideration of the detailed description below, in conjunction with the accompanying drawings. As will become readily apparent to those skilled in the art from the following description, there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 1A is a top view of a typical microprocessor pin chip array showing a microprocessor chip and groups of laser elements;

FIG. 1B is a cross sectional view through a laser element and a portion of the layer of ceramic underlying the laser element and a portion of a metal layer underlying the layer of ceramic;

FIG. 1C is the cross sectional view as shown in FIG. 1B after a laser cut process and showing the ideal cut or trim of the laser element;

FIG. 1D is the cross sectional view as shown in FIG. 1B after a laser cut process showing a defective laser element cut that has not removed all of the metal in the laser element;

FIG. 1E is the cross sectional view as shown in FIG. 1B after a laser cut process showing a defective laser element cut that has penetrated through the ceramic layer into the underlying metal layer;

DETAILED DESCRIPTION

Figures 2A, 2C:
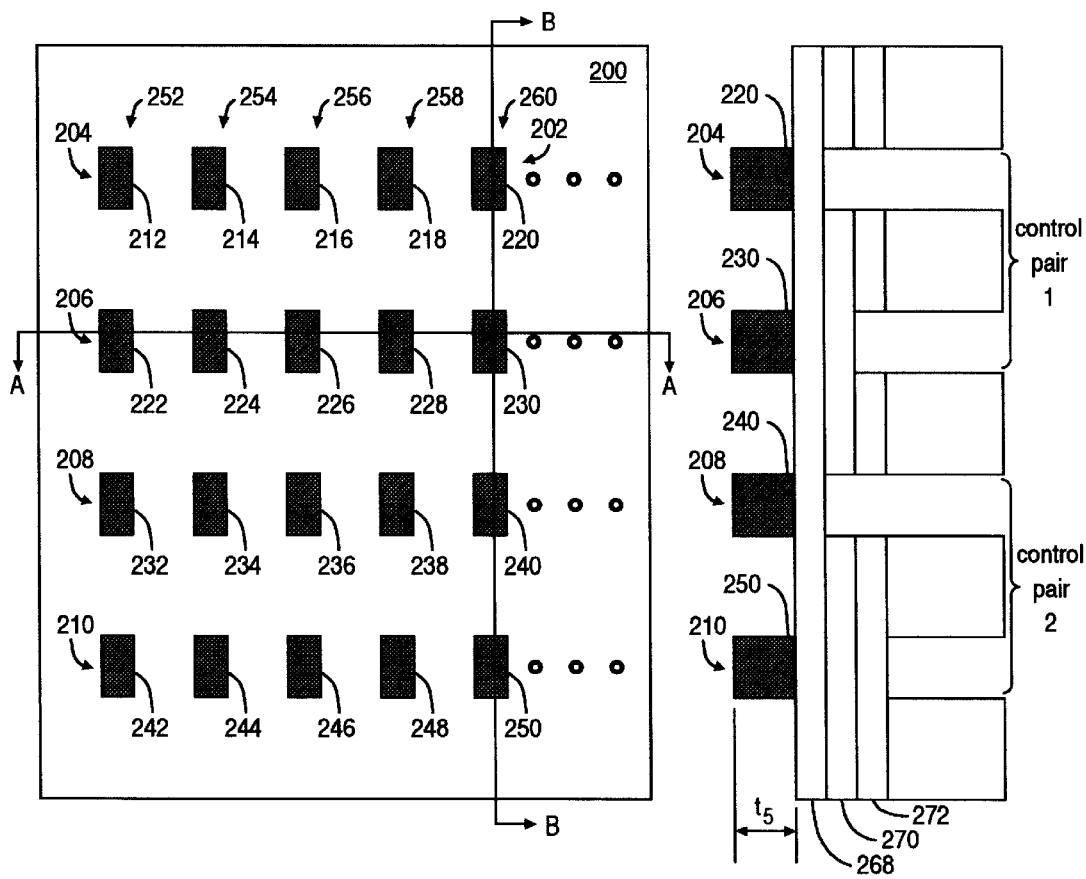
FIG. 2A is a top view of a mechanical gauge having metal pads positioned on the surface in accordance with the present invention.
FIG. 2C is a cross sectional view of a second portion of the mechanical gauge shown in FIG. 2A showing the varying dimensions of the ceramic substrate underlying the metal pads positioned on the surface of the mechanical gauge.

Reference is now made in detail to a specific embodiment or specific embodiments of the present invention that illustrate the best mode or modes presently contemplated by the inventors for practicing the invention.

FIG. 1A is a top view of a typical semiconductor product 100 packaged in a pin grid array (PGA) configuration with a microprocessor chip 102 positioned approximately in the center of the semiconductor product 100 package. Groups of laser elements L1, L2, L3, L4, L5, L6 and L7 are shown at 104, 106, 108, 110, 112, 114 and 116, respectively. The various groups of laser element represent different configuration choices. For example, the group L1 at 104 could represent BP (BP is the number that represents the multiple of the clock rate) Pins. The group L2 at 106 could be the L2 Select Pins (L2SEL is a multi-bit setting used by the processor to determine what size of L2 (level 2) cache memory is available). The groups L3 and L4, at 108 and 110, respectively, could be BP Multipliers. The group L5 at 112 could be ECC Pins, which are Error Correction Circuit Enable configuration pins.

The laser elements are configured in the surface of the package of the semiconductor product 100 so that the functionalities of the product are configured by cutting or not cutting selected laser elements. The laser trim system is programmed to trim the appropriate laser elements. Because the laser elements are positioned on the surface of the package with further metal layers lying underneath the surface, any cutting by the laser trim system of the underlying metal layer could destroy the semiconductor product 100.

FIG. 1B is a cross sectional view through a laser element 118, a portion of an underlying layer 120 of ceramic and a portion of a metal layer 122 underlying the portion of the layer 120 of ceramic.

FIG. 1C shows the cross sectional view as shown in FIG. 1B after an "ideal" laser cut. The ideal laser cut just cuts through the laser element 118 (shown in dotted outline). Because of the difficulty in calibrating lasers, the ideal cut includes cutting into the layer 120 of ceramic a minimum depth to ensure that all of portion of the laser element 118 being cut is removed. The dotted line 123 shows the part of the layer 120 that has been cut.

FIG. 1D shows the cross sectional view as shown in FIG. 1B after a defective laser cut that has not cut through the laser element 118 leaving a portion of the metal in the laser cut. As should be appreciated, the remaining portion of the metal would not be an effective "cut."

FIG. 1E shows the cross sectional view as shown in FIG. 1C after a defective laser cut that has cut through the laser element 118, cut through the layer 120 of ceramic and has cut into the metal layer 122. The metal layer 122 contains metal circuit structures that can cause the product to fail if cut through or shorted to other metal circuit structures.

FIG. 2A is a top view of a mechanical gauge 200 manufactured in accordance with the present invention. A series of metal pads 202 are formed on the surface the mechanical gauge 200. As will be discussed below in conjunction with FIG. 2C the series of metal pads 202 are formed in pairs. In addition, the metal pads 202 are formed at various heights as will be discussed below in conjunction with FIG. 2B. For purposes of discussion, the series of metal pads 202 are formed in rows with rows 1, 2, 3, and 4 indicated at 204, 206, 208 and 210, respectively. Row 1, 204, includes metal pads 212, 214, 216, 218, and 220, respectively. Row 2, 206, includes metal pads 222, 224, 226, 228, and 230, respectively. Row 3, 208, includes metal pads 232, 234, 236, 238, and 240, respectively. Row 4, 210, includes metal pads 242, 244, 246, 248, and 250, respectively. The series of metal pads 202 also form columns with columns 1, 2, 3, 4, and 5, indicated at 252, 254, 256, 258, and 260, respectively. It is noted that more rows and more columns can be included on the mechanical gauge 200.

Figure 2B:
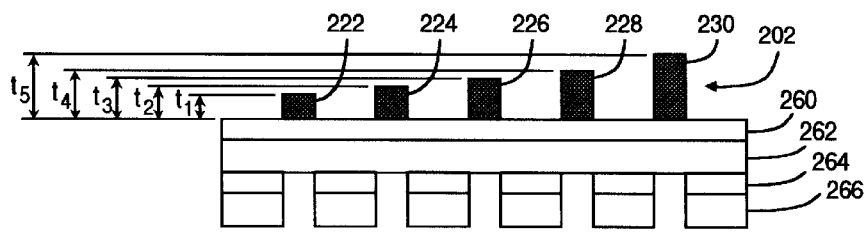
FIG. 2B is a cross sectional view of a first portion of the mechanical gauge shown in FIG. 2A showing the various heights of the metal pads positioned on the surface of the mechanical gauge.

Referring to FIG. 2B, which is a cross sectional view AA, it is shown that the metal pads in each row have various heights ranging from $t_1$ to $t_5$. As indicated in FIG. 2A, the cross sectional view in FIG. 2B is through the metal pads in row 2, 206, therefore metal pads 222, 224, 226, 228 and 230 are shown. The heights $t_1$ through $t_5$ bracket the height of laser elements that are formed on a semiconductor product. It is noted that with more columns, the heights will continue from $t_5$ through $t_x$ (with x equal to the total number of columns). The metal pads 202 are formed on ceramic tapes, 260, 262, 264 and 266, which have various thicknesses.

Referring to FIG. 2C, which is a cross sectional view BB, it is shown that the metal pads are formed in pairs. As indicated in FIG. 2A, the cross sectional view in FIG. 2C is through the metal pads in column 5, 260, therefore metal pads 220, 230, 240 and 250 are shown. The pairs are, for example, the metal pads in row 1, 204 and the corresponding metal pads in row 2, 206. The pairs of metal pads are control pads and metal pads 220 and 230 form control pair land metal pads 240 and 250 form control pair 2. The difference between the control pairs is the number of thicknesses of ceramic substrate underlying the metal pads. The layers of ceramic are shown at 268, 270 and 272. For example, one of each pair of metal pads (metal pads 220 and 240, in control pair 1 and control pair 2, respectively) has a single thickness of ceramic underlying the metal pad. The other metal pad of the pair has more than one thickness of ceramic underlying the metal pad. For example, metal pad 230 has two thicknesses of ceramic underlying the metal pad 230 and metal pad 250 has three thicknesses of ceramic underlying the metal pad 250. It is noted that the thicknesses of the layers of ceramic underlying other control pairs can vary in order to obtain a more precise indication of how deep the laser system is cutting through the metal pad and into the layer of ceramic underlying the metal pad.

Figure 3:
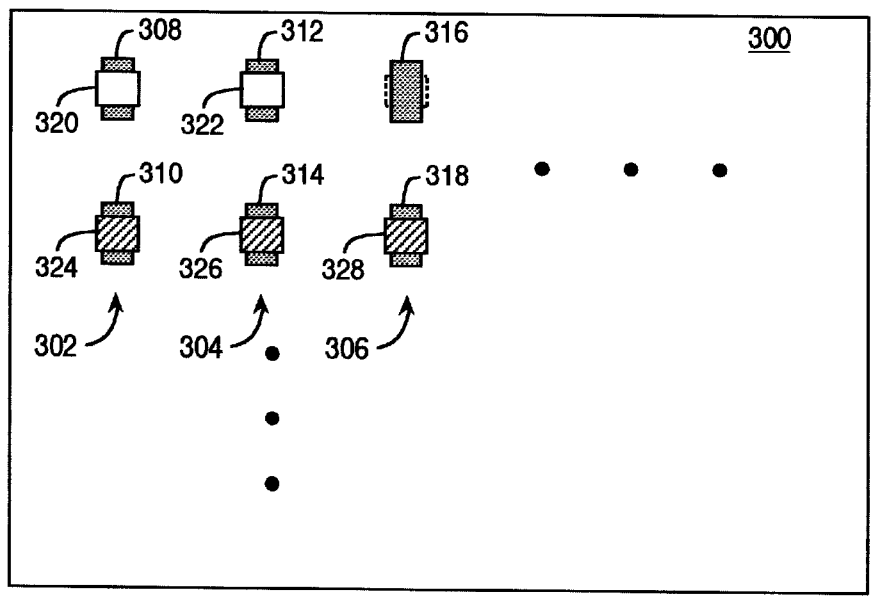
FIG. 3 is a top view of a mechanical gauge similar to the mechanical gauge shown in FIG. 2A showing the state of the metal pads after the metal pads have been subjected to a laser trim process.

Referring to FIG. 3, there is shown a portion of a mechanical gauge 300 after it has been subjected to a laser element cutting (or trimming) operation. A light is directed through the mechanical gauge 300. Shown are three pairs of metal pads, 302, 304 and 306, respectively. Pair 1, 302 shows metal pads 308 and 310. Pair 2, 304 shows metal pads 312 and 314, respectively. Pair 3, 306 shows metal pads 316 and 318. The squares 320 and 322 indicate that the metal pads 308 and 312 have been cut through and because there is no light shining through metal pad 316 it has not been cut through. The squares 324, 326, and 328 indicate that the ceramic underlying the metal pads 310, 314, and 318 has not been cut. This indicates that the laser can cut a metal pad of the same thickness as pair 2 but not damage a trace in layers lower than the maximum allowable ceramic thickness.

Figure 4:
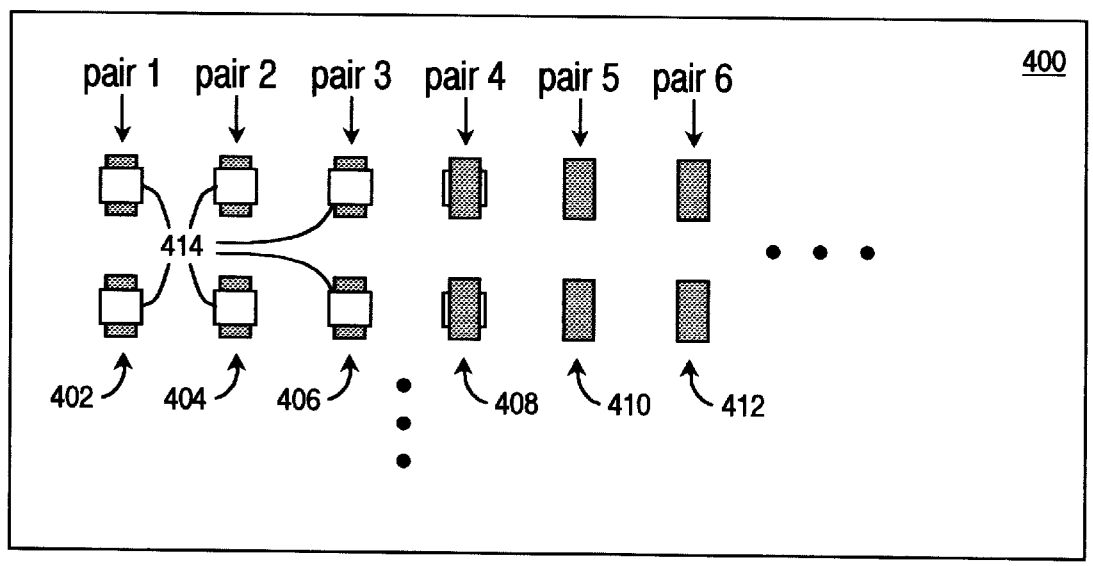
FIG. 4 is a top view of a mechanical gauge similar to the mechanical gauge shown in FIG. 2A showing the state of selected pairs of metal pads on the mechanical gauge after the metal pads have been subjected to a laser trim process and illustrating how the depth of the laser trim is determined.

Referring to FIG. 4, there is shown a portion of a mechanical gauge 400 after it has been subjected to a laser element cutting (or trimming) operation. A light is directed through the mechanical gauge 400. Shown are six pairs of metal pads, 1 through 6, 402, 404, 406, 408, 410, and 412, respectively. The light shown transmitted through both the top and bottom elements of pairs 1–3, 402, 404, and 406, respectively, indicates that the laser trim settings are too high because the layer of ceramic underlying the metal pads is cut through and the metal layer underlying the layer of ceramic would be cut causing the product to fail. As discussed above, the unfilled squares 414 indicate that light is being transmitted through the gauge 400.

In summary, the described invention provides a method of utilizing a mechanical gauge to accurately determine the depth of a laser utilized in a laser element cutting process.

The foregoing description of the embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of calibrating a laser utilized in a laser element cutting system that cuts laser elements formed on a surface of a semiconductor product package, the method comprising:

(a) forming a mechanical gauge having metal pads disposed at the intersections of rows and columns on a surface of a substrate material, wherein the metal pads have varying heights and the mechanical gauge has varying depths of the substrate material underlying the metal pads formed on the surface of the substrate material, and wherein the metal pads are formed in control pairs;

(b) subjecting each metal pad to a laser cut process;

(c) directing light through the mechanical gauge; and (d) determining which metal pads transmit light; and (e) determining the depth of the laser cut process.

2. The method of claim 1 wherein the step of forming a mechanical gauge includes forming the metal pads in each row with a varying height from $t_1$ in column 1 to $t_x$ in column x, whereby each metal pad in each column has the same height.

3. The method of claim 1 wherein the step of forming a mechanical gauge with the metal pads formed in control pairs includes forming pairs in columns from an odd numbered row and the next even numbered row.

4. The method of claim 1 wherein the step of forming pairs in columns from an odd numbered row and the even numbered row includes forming the metal pad of each pair in the odd numbered row on a single layer of substrate material and forming the metal pad of each pair in the even numbered row on varying numbers of layers of substrate material.

5. The method of claim 1 wherein the step of determining the depth of the laser cut process includes determining the number of layers of substrate material underlying the second metal pad of each control pair have been cut.

\* \* \* \* \*